United States Patent
Chang

(10) Patent No.: US 8,694,550 B2
(45) Date of Patent: Apr. 8, 2014

(54) MERGING FILE DIRECTORIES

(75) Inventor: John R. Chang, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 890 days.

(21) Appl. No.: 12/242,364

(22) Filed: Sep. 30, 2008

(65) Prior Publication Data

US 2009/0307282 A1 Dec. 10, 2009

Related U.S. Application Data

(60) Provisional application No. 61/059,699, filed on Jun. 6, 2008.

(51) Int. Cl.
*G06F 7/00* (2006.01)
*G06F 17/30* (2006.01)

(52) U.S. Cl.
USPC .......................................... 707/802

(58) Field of Classification Search
USPC .......................................... 707/802
See application file for complete search history.

(56) References Cited

U.S. PATENT DOCUMENTS

| | | | |
|---|---|---|---|
| 5,778,389 A * | 7/1998 | Pruett et al. .......................... 1/1 |
| 6,202,070 B1 * | 3/2001 | Nguyen et al. ........................ 1/1 |
| 6,763,458 B1 * | 7/2004 | Watanabe et al. ............. 713/100 |
| 7,254,784 B2 | 8/2007 | Chang |
| 7,356,677 B1 * | 4/2008 | Rafizadeh ........................ 713/1 |
| 7,370,281 B2 | 5/2008 | Weber |
| 7,756,821 B2 | 7/2010 | Havens et al. |
| 2003/0220838 A1 * | 11/2003 | Ishii et al. ........................ 705/14 |
| 2006/0294515 A1 * | 12/2006 | Gimpl et al. .................. 717/174 |
| 2008/0005133 A1 | 1/2008 | Khalidi et al. |
| 2009/0063571 A1 * | 3/2009 | Narimatsu ..................... 707/200 |

* cited by examiner

*Primary Examiner* — Kuen Lu
(74) *Attorney, Agent, or Firm* — Womble Carlyle Sandridge & Rice LLP

(57) ABSTRACT

A merge method includes determining whether a source item in a source file directory is a file or a subdirectory. If the source item is a file, any conflicting items in a destination file directory are deleted and the file is moved from the source file directory to the destination file directory without copying the file. If the source item is a subdirectory that has no corresponding destination subdirectory in the destination file directory, the subdirectory is moved from the source file directory to the destination file directory without copying the subdirectory. If the source item is a subdirectory that does have a corresponding destination subdirectory, the merge method is repeated for each item of the source subdirectory.

9 Claims, 4 Drawing Sheets

MERGING FILE DIRECTORIES

This Non-Provisional Application claims priority to pending Provisional Application No. 61/059,699, entitled Merging File Directories, filed on Jun. 6, 2008.

FIELD

Embodiments of the invention relate to file organization, and more particularly to merging file directories.

BACKGROUND

Updates to computer systems and various software applications are a practical necessity in today's computing world. Developers are continually working to improve the quality, efficiency and functionality of the computer systems and applications we use. One of the consequences of these improvements is the continual need to install the various updates. One of the challenges of updating a computer system is in the management of files and file directories. Traditional techniques for merging file directories involve copying source files, inserting the copies into a destination directory and then deleting the original source files. Such techniques can be unnecessarily slow.

SUMMARY OF THE INVENTION

A merge method includes determining whether a source item in a source file directory is a file or a subdirectory. If the source item is a file, any conflicting items in a destination file directory are deleted and the file is moved from the source file directory to the destination file directory without copying the file. If the source item is a subdirectory that has no corresponding destination subdirectory in the destination file directory, the subdirectory is moved from the source file directory to the destination file directory without copying the subdirectory. If the source item is a subdirectory that does have a corresponding destination subdirectory, the merge method is repeated for each item of the source subdirectory.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

DETAILED DESCRIPTION

Embodiments described herein facilitate merging of file directories on a computer system. A MERGE operation is performed on two existing directory structures using an optimal sequence of individual MOVE operations on files and subdirectories contained in the directory. In various embodiments, the MOVE operations described herein are performed without copying any files. The number of MOVE operations required is directly proportional to the number of move conflicts. In this way, the merging can be highly efficient at combining two existing directory structures that are different in content. In the best case, the merging is instantaneous and in the worst case, the merging described herein is still faster than merging through the traditional process of copying and deleting files.

In order to discuss the invention clearly and concisely, embodiments discussed herein will frequently refer to the installation of an operating system. However, embodiments are not limited to operating system installation. Methods, techniques, systems, components, etc., described herein can be used for merging any two file directories including during software installation, security updates, installing new applications, upgrades to applications and the like.

Figure 1:
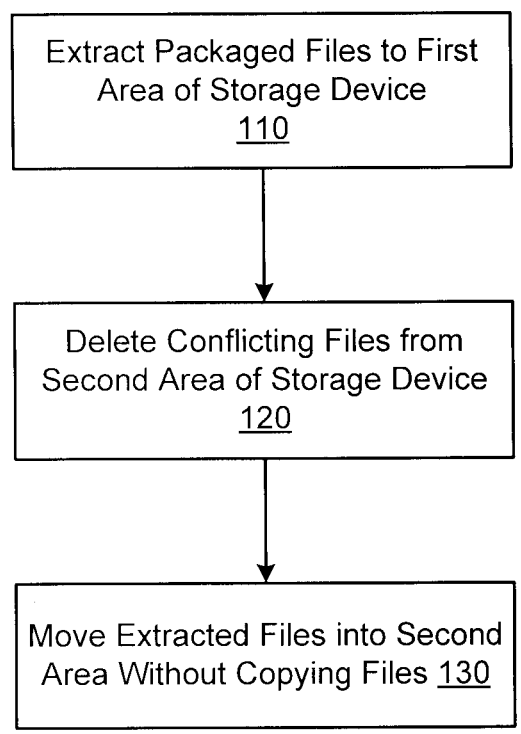
FIG. 1 is a flow diagram illustrating a merge process according to various embodiments.
Figure 2:
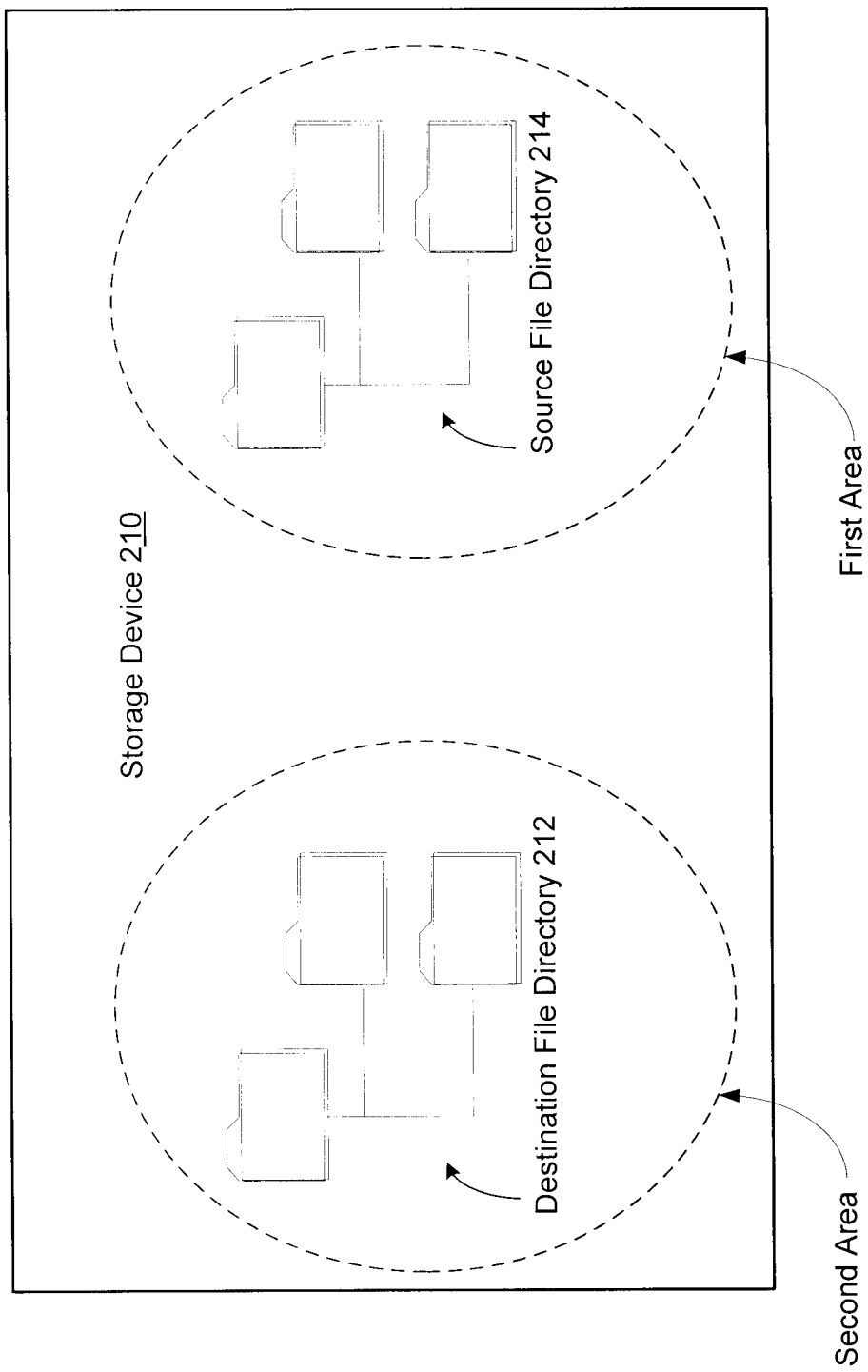
FIG. 2 is a block diagram illustrating different file directories in a storage partition.

Within the context of installing a new operating system (or upgrading software), various embodiments of a process for installing the new files associated with the new operating system can be described as shown in the generalized flow diagram of FIG. 1. As discussed above, an OS installer on the new partition updates the old or original partition with new operating system files. In various embodiments, these packaged files are extracted 110 to a first area of the original partition. More particularly, the first area is file directory. As used herein, this file directory in the first area may be referred to as a source file directory and/or a sandbox and is illustrated in FIG. 2. The purpose of the sandbox is to create a space on the original partition that is separate from and/or independent of the original (or existing) file directory on the old partition. In this way, the new operating system can be "assembled" and tested in an isolated environment before it actually goes "live" on the original partition (e.g., storage partition 210).

Having extracted the new OS files to the sandbox, conflicting files are deleted 120 from the original (or existing) file directory (i.e., the second area of the original partition). This original file directory is referred to herein as the destination file directory and is illustrated in FIG. 2. Once the conflicting files are deleted, the extracted files are then moved 130 from the source file directory 214 to the destination file directory 212. The deleting and moving of files may be referred to as "merging." For some of the files in the source directory, there might be no conflicting files in the destination directory. In those cases, the source files are simply moved into the destination directory using a MOVE operation. In various embodiments, the MOVE operation moves files from one location to another location without copying the files. In cases where a source file conflicts with a previously existing file in the destination directory, the old file must be deleted before the source file can be moved into place using a MOVE operation. In some embodiments, a REPLACE operation deletes a conflicting file and moves a source file into place in a single atomic operation. Thus, in some embodiments, steps 120 and 130 of FIG. 1 can be performed in a single step.

In various embodiments, the determination of conflicts between files in source file directory 214 and destination file directory 212 are made based on whether a file is an operating system file or a user file. Distinguishing system files from user files is further described below.

Figure 3:
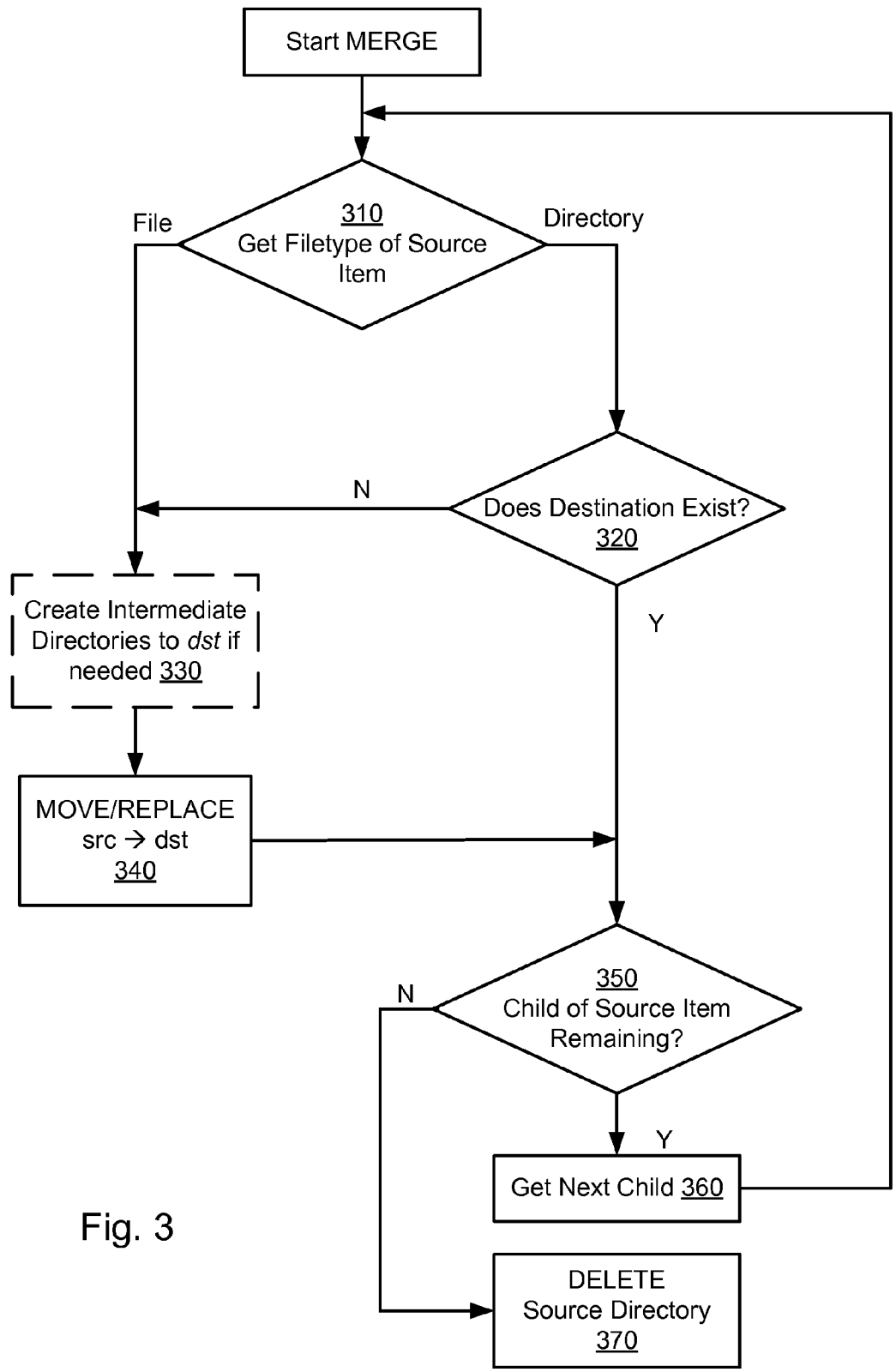
FIG. 3 is a block diagram illustrating a computer system suitable for use in various embodiments.

FIG. 3 is a flow diagram illustrating a merge process according to various embodiments. A source item in a source file directory is to be merged into a destination file directory. The merge process begins by getting the file type of the source item to be merged 310. The file type will be either a file or a directory (e.g., a folder). If the source item is a file and has no conflicts with any file in the destination file directory, then the source item is simply moved into place in the destination file directory 340. In various embodiments, the MOVE operation performed does not involve copying the source item to its destination. If the source item is a file and does conflict with a file in the destination file directory, the conflicting file is replaced with the source item, again without copying the file 340. Replacing a conflicting file involves deleting the conflicting file and then moving the new file into place. In various embodiments, the replacing is performed as a single atomic operation.

If the file type of the source item is a directory, then it is determined whether a corresponding destination directory exists 320. If not, then the source item (i.e., directory) has no conflicts and can be moved into the destination file directory 340. In some embodiments, an intermediate sub-directory may be created in the destination file directory 330 to receive the source directory.

If the source item is a directory and there is a corresponding destination directory, it is determined whether the source directory has any children 350. If yes, then the next child is retrieved 360 and the merge process begins a new iteration for the child. In the case that the child is a file that is moved 340 into the destination directory (or replaces an existing file in the destination directory), the algorithm continues by determining again whether any children remain 350.

When all of the children of the source directory have been merged into the destination directory, the source directory is left empty and is, therefore, deleted 370.

Figure 4:
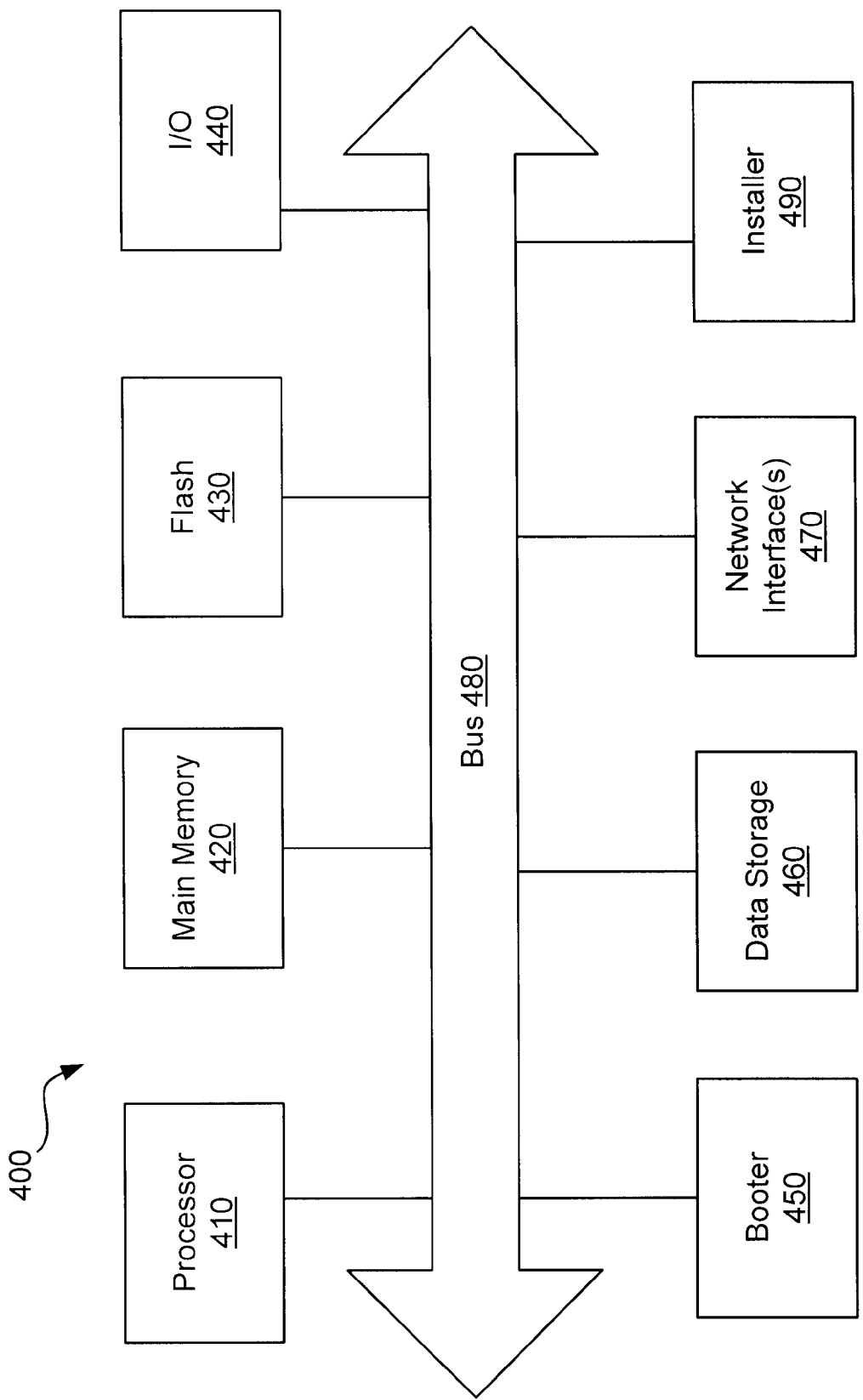
FIG. 4 is a block diagram illustrating a suitable computing environment for use in various embodiments.

FIG. 4 is a block diagram illustrating a suitable computing environment for practicing various embodiments described herein. Collectively, these components are intended to represent a broad category of hardware systems, including but not limited to general purpose computer systems and specialized handheld computer devices.

Computer system 400 includes processor 410, I/O devices 440, main memory 420 and flash memory 430 coupled to each other via a bus 480. Main memory 420, which can include one or more of system memory (RAM), and nonvolatile storage devices (e.g., magnetic or optical disks), stores instructions and data for use by processor 410. Additionally, the network interfaces 470, data storage 460, installer 490 and booter 450 are coupled to each other via a bus 480. Data storage 460 stores the structured data (e.g., contact information, calendars, etc.) described herein.

The various components of computer system 400 may be rearranged in various embodiments, and some embodiments may not require nor include all of the above components. Furthermore, additional components may be included in system 400, such as additional processors (e.g., a digital signal processor), storage devices, memories, network/communication interfaces, etc.

In the illustrated embodiment of FIG. 4, methods and apparatuses for providing synchronization between multiple computers according to the present invention as discussed above may be implemented as a series of software routines run by computer system 400 of FIG. 4. These software routines comprise a plurality or series of instructions to be executed by a processing system in a hardware system, such as processor 410. Initially, the series of instructions are stored on a data storage device 460, memory 420 or flash 430.

Various components described herein may be a means for performing the functions described herein. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a computer readable medium, which provides content that represents instructions that can be executed. For example, installer 490 and booter 450 may be software modules running on a processor (e.g., processor 410). The content may result in a computer performing various functions/operations described herein. A computer readable storage (or machine readable or electronically accessible) medium includes any mechanism that stores information in a form accessible by a computing device (e.g., computer, PDA, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or the like. A computer readable medium may also include a storage or database from which content can be downloaded. A computer readable medium may also include a device or product having content stored thereon at a time of sale or delivery. Thus, delivering a device with stored content, or offering content for download over a communication medium may be understood as providing an article of manufacture with such content described herein.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A method for merging a source file directory with a destination file directory on a computer, wherein the source file directory includes a plurality of source items, the merge method comprising:
for each source item included in the plurality of source items:
when the source item is a file, determining whether the file conflicts with at least one file in the destination file directory, and
when the file conflicts with the at least one file in the destination file directory:
deleting the at least one file from the destination file directory, and
moving the file from the source file directory to the destination file directory without copying the file;
when the source item is a subdirectory having no corresponding subdirectory in the destination file directory:
moving the subdirectory from the source file directory to the destination file directory without copying the subdirectory;
when the source item is a subdirectory having a corresponding subdirectory in the destination file directory:
carrying out the merge method for any source items included in the subdirectory; and
when the plurality of source items are removed from the source file directory:
deleting the source file directory.

2. The method of claim 1, further comprising creating an intermediate subdirectory in the destination file directory when the source item is a subdirectory having no corresponding subdirectory in the destination file directory.

3. The method of claim 1, wherein the merge method involves carrying out a security update.

4. A non-transitory computer readable storage medium storing instructions that, when executed by a processor, cause the processor to carry out a merge technique that involves merging a source file directory with a destination file directory on a computer, wherein the source file directory includes a plurality of source items, by performing steps that include:
    for each source item included in the plurality of source items:
        when the source item is a file, determining whether the file conflicts with at least one file in the destination file directory, and
            when the file conflicts with the at least one file in the destination file directory:
                deleting at least one file from the destination file directory, and
                moving the file from the source file directory to the destination file directory without copying the file;
        when the source item is a subdirectory having no corresponding subdirectory in the destination file directory:
            moving the subdirectory from the source file directory to the destination file directory without copying the subdirectory;
        when the source item is a subdirectory having a corresponding subdirectory in the destination file directory:
            carrying out the merge technique for any source items included in the subdirectory; and
        when the plurality of source items are removed from the source file directory:
            deleting the source file directory.

5. The non-transitory computer readable storage medium of claim 4, wherein the processor is further configured to create an intermediate subdirectory in the destination file directory when the source item is a subdirectory having no corresponding subdirectory in the destination file directory.

6. The non-transitory computer readable storage medium of claim 4, wherein the merge technique involves carrying out a security update.

7. A system configured to perform a merge technique that involves merging a source file directory with a destination file directory, the system comprising:
    a memory; and
    a processor, wherein the processor is configured to:
    for each source item of a plurality of source items included in the source file directory:
        when the source item is a file, determining whether the file conflicts with at least one file in the destination file directory, and
            when the file conflicts with the at least one file in the destination file directory:
                deleting the at least one file from the destination file directory, and
                moving the file from the source file directory to the destination file directory without copying the file;
        when the source item is a subdirectory having no corresponding subdirectory in the destination file directory:
            moving the subdirectory from the source file directory to the destination file directory without copying the subdirectory;
        when the source item is a subdirectory having a corresponding subdirectory in the destination file directory:
            carrying out the merge technique for any source items included in the subdirectory; and
        when the plurality of source items are removed from the source file directory:
            deleting the source file directory.

8. The system of claim 7, wherein the processor is further configured to create an intermediate subdirectory in the file directory when the source item is a subdirectory having no corresponding destination subdirectory in the destination file directory.

9. The system of claim 7, wherein the merge technique involves carrying out a security update.

* * * * *

UNITED STATES PATENT AND TRADEMARK OFFICE
CERTIFICATE OF CORRECTION

PATENT NO. : 8,694,550 B2
APPLICATION NO. : 12/242364
DATED : April 8, 2014
INVENTOR(S) : John R. Chang It is certified that error appears in the above-identified patent and that said Letters Patent is hereby corrected as shown below:

In the Claims:

Col. 5, line 20 (Claim 4, line 14) "deleting at least" should read --deleting the at least--.

Col. 6, line 37 (Claim 8, line 2) "in the file" should read --in the destination file--.

Col. 6, line 39 (Claim 8, line 4) "corresponding destination subdirectory" should read --corresponding subdirectory--.

Signed and Sealed this
Nineteenth Day of August, 2014

Michelle K. Lee
*Deputy Director of the United States Patent and Trademark Office*